United States Patent [19]

Hamar

[11] 4,256,205

[45] Mar. 17, 1981

[54] BICYCLE BRAKE ADJUSTMENT DEVICE

[76] Inventor: Douglas A. Hamar, 0236 SW. Palatine Hill Rd., Portland, Oreg. 97219

[21] Appl. No.: 47,339

[22] Filed: Jun. 11, 1979

[51] Int. Cl.³ .............................................. B62L 1/12
[52] U.S. Cl. .................................. 188/24; 188/196 M
[58] Field of Search ...................... 188/2 D, 24, 196 M

[56] References Cited

FOREIGN PATENT DOCUMENTS 75481 6/1894 Fed. Rep. of Germany ............. 188/24

*Primary Examiner*—Duane A. Reger
*Attorney, Agent, or Firm*—James D. Givnan, Jr.

[57] ABSTRACT

A device for installation between a brake cable and a caliper brake assembly the device including a base which adjustably receives a threaded elongate shaft upwardly attached to the brake cable end. A nut locks the base and shaft together after adjustment. At the base lower end is a coupler engageable with the bridle of a caliper brake assembly. The coupler is sleeve shaped to permit telescopic passage of the elongate threaded shaft for a wide range of adjustments.

5 Claims, 3 Drawing Figures

U.S. Patent  Mar. 17, 1981  4,256,205
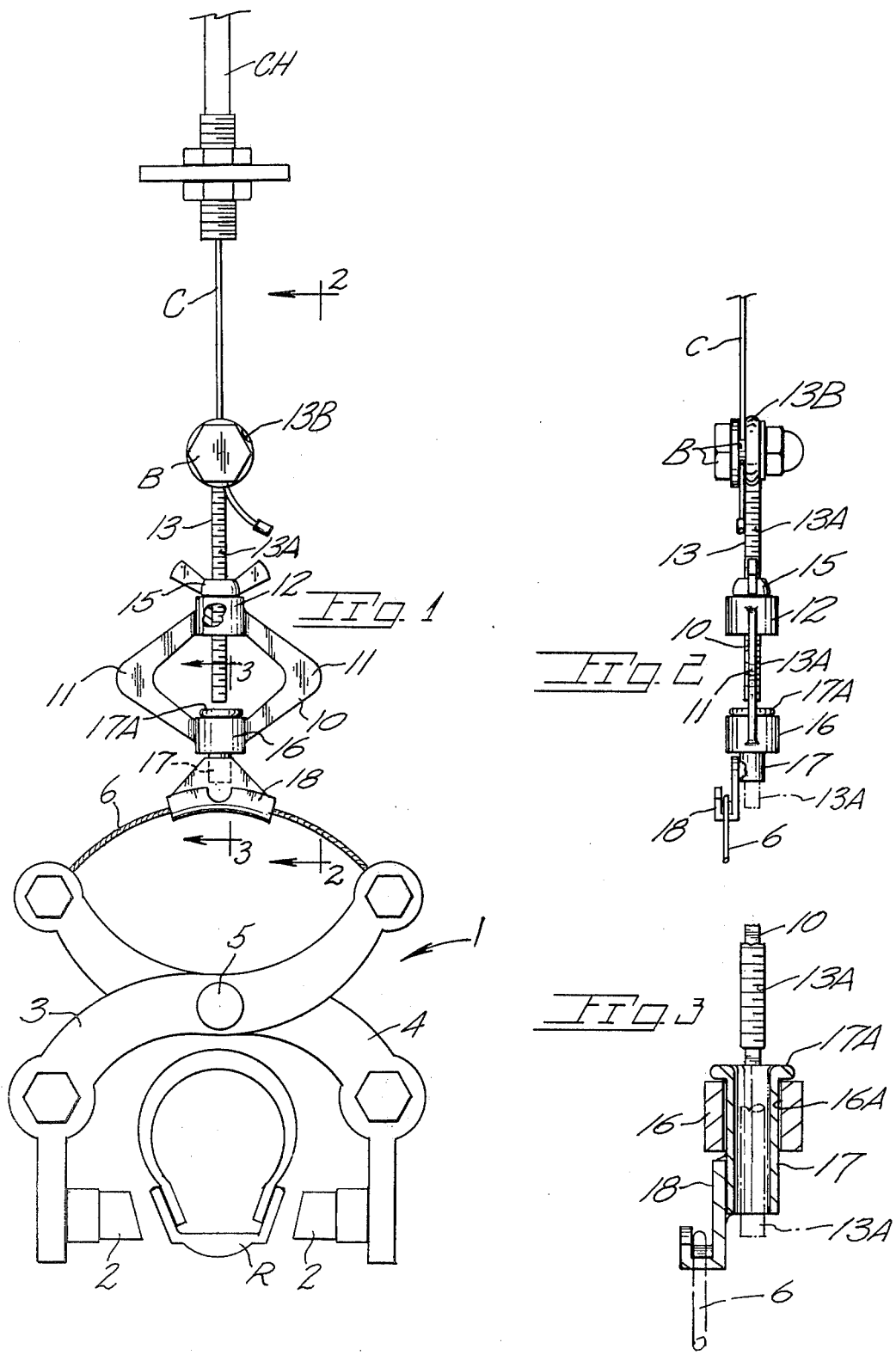

BICYCLE BRAKE ADJUSTMENT DEVICE

BACKGROUND OF THE INVENTION

The present invention is directed toward that class of device interposed between a caliper brake actuating cable and the caliper brake assembly of a bicycle for brake adjustment purposes.

Caliper bicycle brakes typically include a lengthy, housed cable coupled at one end to rider actuated means such as a handlebar mounted "handbrake". Brake actuation over a period of time results in cable elongation to the extent braking action is reduced. Additionally, wear of the opposed brake pads contributes to reduced braking action. Accordingly, for optimum braking it is important that bicycle brakes be periodically adjusted.

Brake adjustment is complicated by the fact that consideration must be made for pad wear, cable elongation and any out of true condition of the wheel rim. Efforts to simplify brake adjustment can be found in U.S. Pat. No. 3,874,256 which discloses a device for holding brake pads in full contact with a wheel rim while the brake cable is advanced relative its attachment point to the brake assembly. A second proposed solution is found in U.S. Pat. No. 4,023,653 wherein a recessed fitting receives a cable adjusting element, said fitting recess automatically providing necessary brake pad clearance. Such devices require considerable manual dexterity and know-how of the user, a tool or tools, and are not usable with wheel rims which are out of true.

A further hindrance to providing suitable adjustment means for a caliper brake is the limited clearance available for such means, i.e., the vertical distance between the caliper brake assembly and the end of the brake cable housing normally fixed within a bracket. The range of adjustment is normally very restricted.

SUMMARY OF THE PRESENT INVENTION

The present invention is embodied in a compact brake adjustment device having a base which carries an elongate assembly in a manner providing a wide range of brake adjustments.

A base receives the elongate assembly in a manually adjustable and lockable manner with one end of said assembly for attachment to the brake cable. Also carried by the base is coupling means engageable with the caliper brake assembly. Said coupling means does not interfere with lengthwise adjustment of the elongate assembly relative said base.

Important objects of the present invention include the provision of an adjustment device interposed between a brake assembly and a brake assembly actuating cable which device provides convenient adjustment of the "effective" length of the cable by increasing or decreasing the distance between the cable attachment point and the brake assembly; the provision of a brake adjustment device for caliper brakes which device lends itself to convenient manual adjustment; the provision of a brake adjustment device providing virtually unlimited degrees of brake adjustment to suit individual desires and accommodate wheel rim irregularities; the provision of a brake adjustment device having telescoping components allowing for a wide range of adjustments. Additional objectives will become subsequently apparent.

BRIEF DESCRIPTION OF THE DRAWING

In the accompanying drawing:

FIG. 1 is a front elevational view of the present device disposed in place between a center-pull caliper brake assembly and the end segment of a brake actuating cable;

FIG. 2 is a side elevational view of the device taken along line 2—2 of FIG. 1; and FIG. 3 is a vertical sectional view of a base fragment and coupling means taken approximately along line 3—3 of FIG. 1.

DETAILED DESCRIPTION OF THE PREFERRED EMBODIMENT

In the accompanying drawing, applied reference numerals indicate parts similarly identified in the following description with reference numeral 1 indicating generally a caliper brake assembly of the center-pull type.

Said brake assembly includes brake pads 2 each carried by caliper brake arms 3 and 4 pivotally mounted at 5 to a bicycle frame or fork component not shown. A bridle at 6 extends intermediate the upper ends of said arms to which the bridle is secured by conventional fastening means. Spring means not shown urges the arm lower ends outwardly to the unbraked condition of FIG. 1. During braking, brake pads 2 oppositely engage a wheel rim at R.

With attention now to the present invention, the subject device includes a base 10 having lateral extensions or appendages 11. A boss 12 is internally threaded to adjustably receive an elongate assembly 13 including a shaft 13A terminating upwardly in an eye 13B. Occupying the eye is a fastener assembly of the type commonly used to bind a brake cable C and having an apertured bolt B for cable insertion. A wing nut at 15 locks elongate assembly 13 to base 10 and both against rotation. Brake actuating cable C is slidably housed in the conventional manner within a flexible cable housing CH the latter supported at points therealong.

With attention again to base 10, the same includes a lower boss 16 having a bore 16A (FIG. 3). Rotatably carried in lower boss 16 are coupling means 17 in the form of a sleeve flanged at its upper end at 17A so as to be supported by the boss surface in a freely rotatable manner. Affixed, as by a weld, to the sleeve exterior is a bridle carrier 18.

From the foregoing it will be evident that in a braking operation tensioning of cable C will lift base 10 and bridle carrier 18 causing the brake arms to close in caliper fashion to bias brake pads 2 against rim R.

As earlier noted, repeated brake use results in gradual elongation of cable C as well as a reduction by wear of the brake pad thickness. Without adjustment the manipulated brake controls eventually move throughout their full range of travel without forcefully biasing the brake pads into rim contact.

In such instances where braking action has diminished, it is necessary with the present device only to back nut 15 off to permit manual rotation of base 10 to cause retraction (or extension) of elongate assembly 13 and resultant increased tensioning (or slacking) of cable C to the extent brake control actuation, in a braking operation, again forcefully biases the brake pads into rim contact to restore braking action. Conversely, during control release, proper adjustment of the device permits adequate outward displacement of the brake pads by the caliper spring mechanism to avoid pad-to-rim wiping contact with out of true rims. Accordingly, the user is provided a virtually unlimited range of brake adjustment all without the necessity of brake adjustment tools or temporarily attached devices. The telescopic feature permits the use of an elongate threaded shaft 13A which may be received and pass through sleeve 17 per FIG. 3 to a retracted position.

While I have shown but one embodiment of the invention it will be apparent to those skilled in the art that the invention may be embodied still otherwise without departing from the spirit and scope of the invention.

Having thus described the invention, what is desired to be secured under a Letters Patent is:

1. A device for adjustably coupling a caliper type bicycle brake assembly to a brake actuating cable to facilitate brake adjustment without alteration of brake cable length, said device comprising,
    a base,
    an elongate assembly in threaded lockable engagement at one end with said base, said elongate assembly having a remaining end for attachment to the brake actuating cable,
    said base and said elongate assembly adapted for extension and retraction relative one another upon rotational movement therebetween to increase or decrease the overall length of the base and elongate assembly,
    coupling means rotatably carried by the base and adapted for engagement with the caliper brake assembly, and
    said device upon extension or retraction respectively increasing or decreasing the effective distance between its attachment to the brake cable and to the brake assembly to provide desired brake operation without alteration of the effective length of the brake cable.

2. The device claimed in claim 1 wherein said base is rotatable relative said elongate assembly and said coupling means, said coupling means defines an opening for passage of one end of the elongate assembly during retraction of the elongate assembly.

3. The device claimed in claim 2 wherein said base includes appendages to facilitate manipulation.

4. The device claimed in claim 3 wherein said coupling means includes a bridle carrier.

5. The device claimed in claim 3 wherein said elongate assembly additionally includes a wing nut for locking engagement with said base.

* * * * *